US008661133B2

(12) United States Patent
Park et al.

(10) Patent No.: US 8,661,133 B2
(45) Date of Patent: Feb. 25, 2014

(54) METHOD FOR ALLOWING AND BLOCKING A USER PC WHICH CAN USE INTERNET AT THE SAME TIME IN A PRIVATE NETWORK THEREOF A METHOD FOR ANALYZING AND DETECTING A JUDGEMENT ABOUT WHETHER NAT(NETWORK ADDRESS TRANSLATION) CAN BE USED OR NOT USING A TRAFFIC DATA, AND THE NUMBER OF TERMINALS SHARING NAT

(75) Inventors: Hyoung-Bae Park, Seoul (KR); Yun-Seok Lee, Seoul (KR); Kyu-Min Choi, Seoul (KR); Kyoung-Pil Kong, Seoul (KR); Pil-Sang You, Seoul (KR); Sung-Goo Kim, Seoul (KR)

(73) Assignee: Plustech Inc., Seoul (KR)

( * ) Notice: Subject to any disclaimer, the term of this patent is extended or adjusted under 35 U.S.C. 154(b) by 147 days.

(21) Appl. No.: 13/121,733

(22) PCT Filed: Oct. 28, 2008

(86) PCT No.: PCT/KR2008/006350
§ 371 (c)(1),
(2), (4) Date: Mar. 30, 2011

(87) PCT Pub. No.: WO2010/041784
PCT Pub. Date: Apr. 15, 2010

(65) Prior Publication Data
US 2011/0185060 A1    Jul. 28, 2011

(30) Foreign Application Priority Data

Oct. 10, 2008 (KR) .................. 10-2008-0099860

(51) Int. Cl.
*G06F 13/20* (2006.01)
*G06F 13/14* (2006.01)
*G06F 21/20* (2006.01)
*H04L 12/12* (2006.01)

(52) U.S. Cl.
USPC ........................ 709/226; 709/225; 709/229

(58) Field of Classification Search
None
See application file for complete search history.

(56) References Cited

U.S. PATENT DOCUMENTS

| 6,826,613 | B1 * | 11/2004 | Wang et al. ............... 709/227 |
| 7,043,564 | B1 | 5/2006 | Cook et al. |
| 7,127,524 | B1 * | 10/2006 | Renda et al. .............. 709/245 |
| 7,227,872 | B1 | 6/2007 | Biswas et al. |
| 7,408,926 | B1 | 8/2008 | Moeck et al. |
| 8,194,673 | B2 * | 6/2012 | Srisuresh et al. ......... 370/392 |
| 2004/0139230 | A1 * | 7/2004 | Kim ....................... 709/245 |
| 2006/0109839 | A1 * | 5/2006 | Hino et al. ................ 370/352 |
| 2007/0118669 | A1 * | 5/2007 | Rand et al. ............... 709/245 |

* cited by examiner

*Primary Examiner* — Hanh N Nguyen
*Assistant Examiner* — Joshua A Kading
(74) *Attorney, Agent, or Firm* — Birch, Stewart, Kolasch & Birch, LLP

(57) ABSTRACT

The present invention provides according to an embodiment a method including analyzing traffic; judging whether NAT (Network Address Translation) use of a client configuring and using a private network as well as a being provided an authorized IP address (an Internet IP address) is allowed or not, for analyzing and detecting a number of sharing terminals; creating a database using data; and formulating a policy by using information in the database, so that when users of the private network connect to the Internet at the same time, permission or blocking of Internet use can be executed selectively.

5 Claims, 5 Drawing Sheets

Figure 3

```
If( there are no IDs (new))then
(
            Internet is used normally after adding a record to a
policy pool
)
        If(there exist an ID and an IP )then
        (
            Internet is used normally after correcting a record to a
policy pool
        )
        Else
        (
            If(UseCode number Count< a policy number of
allowed PC)
            Internet is used normally after adding a record
to a policy pool
            )
            Else
            (
                Internet use is blocked
            )
        )
)
```

Figure 4

| ID | An authorized IP | Usercode | A connection time | |
|---|---|---|---|---|
| Test | 220.220.220.1 | 192.168.0.1 | 2:10 | (o) |
| Test | 220.220.220.1 | 192.168.0.2 | 2:12 | (o) |
| Test | 220.220.220.1 | 192.168.0.3 | 2:16 | (o) |
| Test1 | 220.220.220.2 | 192.168.0.5 | 2:14 | (o) |
| Test1 | 220.220.220.2 | 192.168.0.10 | 2:13 | (o) |
| Test | 220.220.220.1 | 192.168.0.4 | 2:19 | (x) |

| ID | A policy number of allowed PC |
|---|---|
| Test | 3 |
| Test1 | 2 |
| Test2 | 1 |
| Test3 | 1 |

METHOD FOR ALLOWING AND BLOCKING A USER PC WHICH CAN USE INTERNET AT THE SAME TIME IN A PRIVATE NETWORK THEREOF A METHOD FOR ANALYZING AND DETECTING A JUDGEMENT ABOUT WHETHER NAT(NETWORK ADDRESS TRANSLATION) CAN BE USED OR NOT USING A TRAFFIC DATA, AND THE NUMBER OF TERMINALS SHARING NAT

TECHNICAL FIELD

The present invention provides a method consisting of a step for judging whether NAT (Network Address Translation) use of a client configuring and using a private network as well as a provided authorized IP address (an Internet IP address) is allowed or not, for analyzing and detecting the number of sharing terminals, a step for creating a database using data, and a step for formulating a policy by using information in database, so that when the users of a private network connect to Internet at the same time, permission or blocking of Internet use can be executed selectively.

BACKGROUND ART

Recently, a case that a user is using an IP sharing device so that many clients can use a network using only one authorized IP address at the same time are generated frequently. Further, there is a trend that many companies and enterprises which configures NAT are increasing bit by bit. Thus, there is a problem that a network traffic, necessity of new facilities, and investment money are increased due to the above trend.

But, such a problem can be solved by counting accurately the number of actual clients who use a network for each line, but when the actual IP addresses of the users of NAT or IP address sharing devices pass through NAP or the IP address sharing devices, they are changed into the authorized IP addresses and it is not possible to grasp the number of the actual clients of an user.

In order to solve this problem, an additional application (Active X, Agent) informing a user's IP address or the number of terminals in an inner network must be mounted. But, after a user recognizes the mounting/operation of this application, he may not execute this application.

DISCLOSURE

In order to solve the above conventional problems, the present invention provides:

a technology for analyzing traffic under a circumstance monitoring all concerned traffic for analyzing and detecting a judgement about whether NAT can be used or not and the number of sharing terminals when a client use Internet;

a technology for collecting and analyzing information which uniquely indicates a web browser information, a user agent information or PC details information of a client included in a traffic of users connected to the Internet, etc., based on the feature that OS version information, Web browser version information, .NET circumstance information and the like are generally different according to the PC types of users;

a technology for extracting a user agent value of a packet header message after the user recognizes mounting/operation or without authorization/permission procedures;

a technology for a step for analyzing a user agent value based on a key, that is, an identification value or an IP address, and executing a unique management by comparing it with a user-agent pool;

a technology for storing collected user agents uniquely at a constant time interval;

a technology for collecting the stored user agents at a constant time interval for a constant time or for a constant period according to a key, that is, an identification value or an IP address, and for counting the number of sharing terminals;

a technology for making amendments by applying an amendment rule on the number of sharing terminals and for storing results obtained by amendment in a database according to a key, that is, an identification value or an IP address, so that a judgement about whether NAT can be used or not by analyzing traffic under a circumstance monitoring all the traffic, and the number of sharing terminals are analyzed and detected;

a technology for judging whether a user is a user who uses the Internet for the first time or not, for a constant time, so that a PC connected to Internet selectively is allowed or blocked;

a technology for executing a particular page on a user web browser according to a policy for a specific user when connecting to Internet;

a technology for managing a policy pool according to a policy number of allowed PCs by a comparison algorithm of PMT (Policy Management Table) when users using NAT connect to Internet simultaneously;

a technology for allowing one PC which is subscribed by an Internet service businessman to use Internet without fail by transmitting a virtual packet according to a TCP hijacking manner if PCs of the users using NAT exceeds the policy number of allowed PCs, and allowing or blocking Internet use selectively for the other PCs according to the policy number of allowed PCs of PMT;

a technology for blocking randomly one PC of a user code list of a concerned user in a policy pool if a button for changing a allowed PC in a blocked page is pressed, and allowing a concerned PC to use Internet;

a technology for deleting a user code list which is not used for a constant time from a stored policy pool;

a technology for allowing or blocking selective Internet use when inputting a domain when entering an address on the URL window of an Internet web browser, or inputting an address having parameters described after a domain, or moving to other Internet sites from a search browser, and moving to the other pages; and a technology for removing any hindrances for users, and preventing an IP address information of a traffic analysis server from being leaked out during analysis and detection of a traffic under the circumstance monitoring a concerned traffic when a client uses Internet.

TECHNICAL SOLUTION

In order to accomplish the above objects, the present invention is characterized in that it consists of a step for extracting a user agent value of a packet header message by analyzing the traffic; a step for analyzing a user agent value based on a key, that is, an identification value or an IP address, and executing a unique management by comparing it with a user-agent pool (UAPool); a step for storing collected user agents uniquely at a constant time interval; a step for collecting the stored user agents at a constant time interval for a constant time or for a constant period according to a key, that is, an identification value or an IP address, and for counting the number of sharing terminals; a step for making amendments by applying an amendment rule on the number of sharing terminals; and a step for storing results obtained by amendment in a database according to a key, that is, an identification value or an IP address.

ADVANTAGEOUS EFFECTS

According to the present invention, it is possible for Internet service subscribers to analyze and detect actual clients by analyzing packets under a network circumstance using NAT method.

When a client uses Internet, a step for judging whether NAT use of a client configuring and using a private network as well as a provided authorized IP address (an Internet IP address) is allowed or not by analyzing traffic under the circumstance monitoring all concerned traffic, a step for analyzing and detecting the number of sharing terminals, a step for creating a database using data, and a step for formulating a policy by using information in database are performed are executed. Thus, when the users of a private network connect to Internet at the same time, permission or blocking of Internet use can be executed selectively.

Generally, the environments such as OS version, Web browser version, .NET and the like are different according to the PC types of users. Information which uniquely indicates a web browser information, a user agent information or PC details information of a client included in a traffic of the users connecting to Internet and etc. are collected, compared, analyzed and stored based on this feature. At this time, during analysis and detection of the traffic, there are not hindrances at all for users, an IP address information of a traffic analysis server is not leaked out, and data is easily created as a database by judging whether NAT use is allowed or not, and analyzing and detecting the number of the sharing terminals.

Further, according to the characteristics of the present invention, the users included in a policy can execute the steps for inputting a domain when entering an address on the URL window of a web browser, for inputting an address having parameters described after a domain or for moving to other sites in a search browser, and for allowing the clients who can use Internet at the same time in a private network when moving to the other site to use Internet, or for blocking Internet use selectively. Thus, Internet use is allowed or blocked for unauthorized and unspecified many persons.

In the infrastructures built by the CEOs of the existing Internet communication business, the maintenance cost of the equipments and a network, and a network speed are limited, but there is a traffic increase due to indiscreet use of NAT, and the sharing terminals and the like via only one provided line.

Consequently, the users who use only one line normally, or the users who subscribe to any lines and then use them had to suffer from much damages in the past, but according to the present invention, there are effects that the CEOs of the existing Internet communication business can improve various kinds of services in the future by investing smaller amount of facilities money and managing fewer maintenance staff. In addition, a common user enjoy a good quality service.

DESCRIPTION OF DRAWINGS

FIG. 3 is a diagram showing a source for comparing a policy pool information and PMT.

FIG. 4 is a diagram showing a policy pool table when an Internet use can be allowed via only three lines.

BEST MODE

Figure 1:
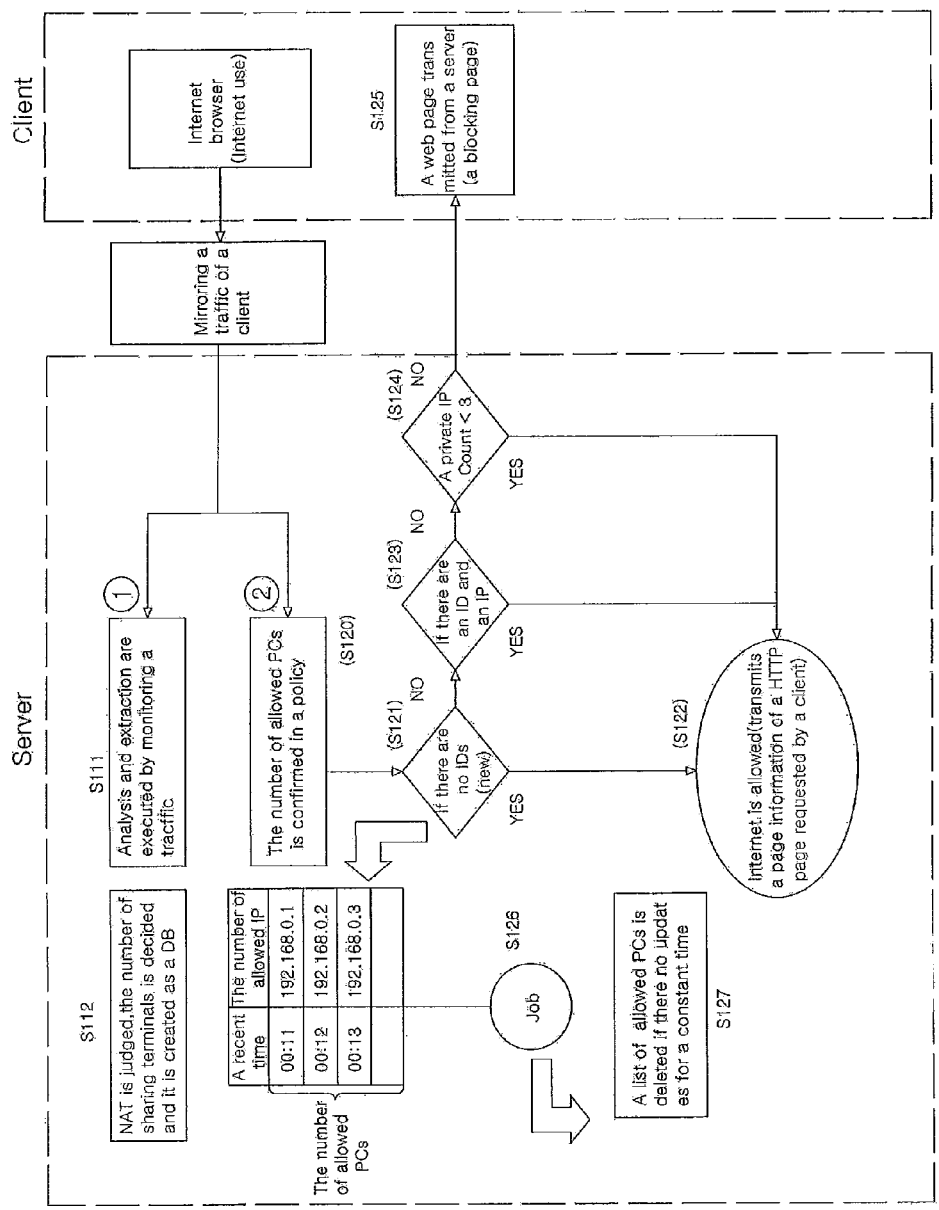
FIG. 1 is a diagram showing a process for controlling detection and a sharing client between a server and a client.

A method according to the present invention for analyzing and detecting a judgement about whether NAT can be used or not by analyzing traffic under a circumstance monitoring all the traffic, and the number of sharing terminals includes a step for extracting a user agent value of a packet header message by analyzing the traffic; a step for analyzing a user agent value based on a key, that is, an identification value or an IP address, and executing a unique management by comparing it with a user-agent pool (UAPool); a step for storing collected user agents uniquely at a constant time interval; a step for collecting the stored user agents at a constant time interval for a constant time or for a constant period according to a key, that is, an identification value or an IP address, and for counting the number of sharing terminals; a step for making amendments by applying an amendment rule on the number of sharing terminals; and a step for storing results obtained by amendment in a database according to a key, that is, an identification value or an IP address.

A method according to the present invention for allowing or blocking a user PC selectively which can use Internet at the same time by analyzing and detecting a judgement about whether NAT can be used or not and the number of sharing terminals includes a step for analyzing a user agent value in a packet when a target user on which allowance or blocking of Internet is applied by monitoring a traffic uses Internet; a step for storing a user code which is a unique identification value of a user agent in a memory or a database table, in a policy pool; a step for storing a user code which is a unique identification value in the policy pool in a real-time manner according to users, and maintaining latest information; a step for managing the policy pool according to a policy number of allowed PCs by a comparison algorithm of PMT when users using NAT connect to Internet simultaneously; and a step for allowing one PC which is subscribed by an Internet service businessman to use Internet without fail by transmitting a virtual packet according to a TCP hijacking manner if PCs of the users using NAT exceeds the policy number of allowed PCs, and Internet use is allowed or blocked for the other PCs according to the policy number of allowed PCs of PMT.

MODE FOR INVENTION

Below, the embodiments of the present invention will be explained in detail with referring to the attached drawings.

In the present invention, first of all, definition of the terminologies that are used all over the specification is as follows.

NAT (Network address Translation) is a terminology meaning a network using a sharing device, VPN and a private IP address, which is defined in a dictionary. PMT (Policy Management Table) is the number of PCs which are allocated to a unique identification value. A user agent may be OS version information, web browser information, user information or detail information of a PC included in a traffic of a user. A user agent pool (UApool) is information created by collecting the user agents.

Further, a user code is a unique code allocated to each of the user agents, and a policy pool is a user code information of a PC which is allocated to a unique identification value. Further, a user agent collection table is a user agent log information collected for each of the unique identification values. A time/user agent table is a user agent information used by a unique identification value sequentially, and a reference detection table is information required for judging whether NAT use is allowed or not.

Figure 2:
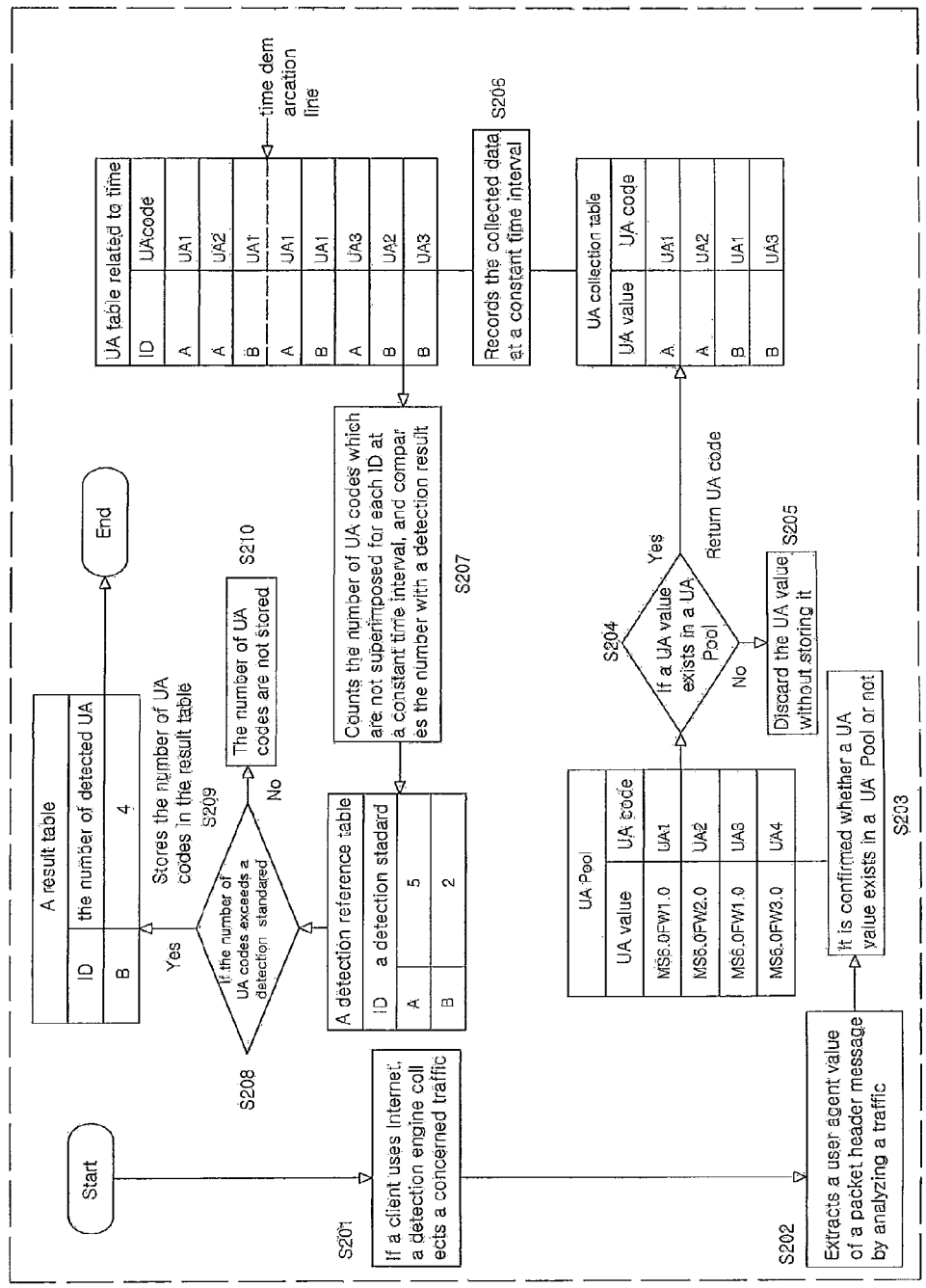
FIG. 2 is a diagram showing an analysis and detection process corresponding to ① of FIG. 1.

FIG. 1 is a diagram showing a process for controlling detection and sharing between a server and a client. FIG. 2 is a diagram showing an analysis and detection process corresponding to ① of FIG.

In order to accomplish the above objects, the present invention provides a method consisting of analyzing traffic, the step S111 for judging whether NAT (Network Address Translation) use of a client configuring and using a private network as well as a provided authorized IP address (an Internet IP address) is allowed or not, for analyzing and detecting the number of sharing terminals, the step S112 for creating a database using data, and the step for formulating a policy by using information in database, so that when the users of a private network connect to Internet at the same time, permission or blocking of Internet use can be executed selectively.

Referring to FIG. 2, when a client uses Internet, a detection engine receives mirroring of traffic under a surrounding that can monitor all concerned data packets in order to judge whether NAT (Network Address Translation) use of a client configuring and using a private network is allowed or not, and for analyzing and detecting the number of sharing terminals (S201).

Information which uniquely indicates a web browser information, a user agent information or PC details information of a packet header message are extracted by analyzing the traffic (S202).

The user agent value is analyzed based on a key, that is, an identification value or an IP, it is compared with the user-agent pool which were collected and managed in advance (S203).

The valid agent values and the user codes required for detection are described in the user agent pool. It is confirmed whether the user agent value which is analyzed based on a key, that is, an identification value or an IP address exists in the user agent pool or not (S204). If the user agent value exists in the user agent pool, the user code which is the unique identification value of the user agent is extracted from the user agent pool, and is stored in the user agent collection table. Then, a next process is executed. If the user agent value does not exist in the user agent pool, the user agent value is not processes any more (S205).

The user code which is returned based on a key, that is, an identification value or an IP is stored in a log storage table, that is, the user agent collection table. A unique management is performed so that same user codes cannot be stored.

At a designated time which is determined as a policy, a user code of a user agent value is stored uniquely at a constant time interval (S206). For example, assuming that a reference value of a key, that is, an identification value or an IP is A, and the valid user code values which are extracted at 0-1 hour is UA1 and UA2, they are stored in a time/user agent table as illustrated in FIG. 2. Further, if the valid user code values which are extracted from A at 1-2 hour are UA1 or UA3, they are stored in the time/user agent table as illustrated in FIG. 2.

The number of the sharing terminals are obtained by collecting the user codes stored in the time/user agent table for a constant time or for a constant period while designating a key, that is, an identification value or an IP address as a reference. For example, if a user code value extracted from an identification value, "A" which is a key for one day is UA1 and UA2 at 0-1 hour, and is UA1 and UA3 at 1-2 hour, UA1, UA2 and UA3 are determined as the unique sharing terminals.

"A" which is determined as above and has "3" is compared with a detection reference table (S207).

If "A" is larger than a reference value of the detection reference table (S208), "A" indicating 3 is stored in a result table (S209), and if "A" is smaller than a reference value of the detection reference table, "A" indicating 3 is not stored in a result table (S210).

According to the result table, a daily history is stored, managed and corrected. The final result is stored in a database, and thus the processes for judging whether the sharing terminals can be used and analyzing and detecting the number of sharing terminals can be executed.

In order to execute the processes such as judging, analysis and detection, a user agent pool is managed. It is determined and analyzed for mirroring of user traffic whether a user agent value is valid or invalid beforehand, and the results are collected. A database is created by extracting valid user agents and is managed. When a user agent value is analyzed based on a key, that is, an identification value or an IP address while managing data of the collected user agent pool, a user code which is a unique identification value of a user agent is allocated so that it can be used as a reference, and a storage/management process are executed continuously.

Referring to ② of FIG. 1, assuming that a network of NAT method is configured, a client X001 using a plurality of PCs exists, and the number of PCs which are allowed in PMT (Policy Management Table) is set to 3 for X001 (S120), first of all, a key, that is, an identification value or an IP address judges whether a user who is now connecting to Internet is a user who uses Internet for the first time or not when a client having an ID such as X001 uses Internet (S121).

'A key, that is, an identification value or an IP address' will be described as an "ID" for explanation.

If an ID such as X001 does not exist in the policy pool, since the ID address is a newly created ID, X001 ID, an authorized IP address, a user code, and a connection time should be registered in the policy pool and then Internet will be used normally.

Further, if same authorized IP addresses and same IDs exist in the policy pool, Internet is used normally by correcting a connection time corresponding to a user code of same ID (S122).

On the contrary, if same authorized IP addresses and same IDs exist in the policy pool, but the user codes does not exist (S123), two case can be considered.

First, after counting the number of the user codes having same IDs in the policy pool, if the result value of counting is below a policy number of PMT, an ID, an authorized IP, a user code, and a connection time should be registered in the policy pool and then Internet will be used normally (S122).

Second, if the number of the user codes having same IDs in the policy pool is above a policy number of PMT (S124), Internet use will be blocked (S125).

At this time, if it is judged that the result value is an Internet permission value, a HTTP page requested by a client is provided and if it is judged that the result value is an Internet blocking value, a blocked page is displayed.

Figures 5, 6:
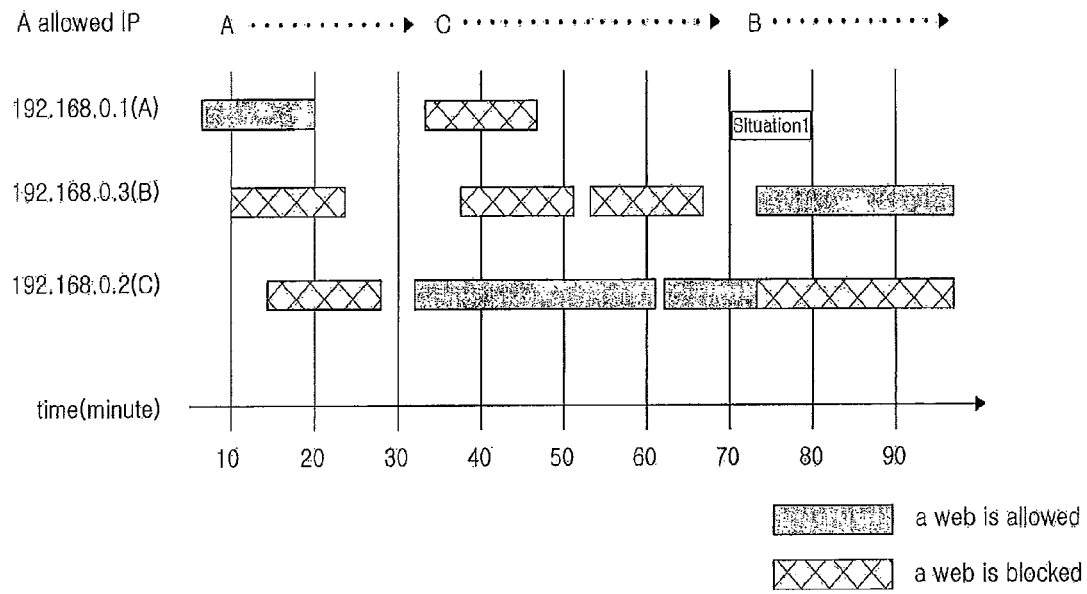
FIG. 5 is a diagram showing PMT.
FIG. 6 is a diagram showing a case that an Internet use is allowed via only one line.

FIG. 3 is an algorithm diagram showing the method in which an Internet us is allowed or blocked selectively by comparing a policy pool information and PMT (S121-S125). FIG. 5 is a diagram showing PMT where the number of terminals which are allocated to each ID, that is, an identification value and are allowed or blocked selectively is defined.

FIG. 4 is a diagram showing data accumulated in a policy pool table according to PMT policy of FIG. 5. It is understood that a test has three user codes and a test1 has two user codes. A user code of a bottom line having a test identification value is entered as a new code, but since there are three user codes in the test, the user code of a bottom line cannot be entered as a fourth code.

Subsequently, in FIG. 1 of the present invention, the JOB scheduler which is operated at a constant time interval is executed so that a policy pool can maintain latest information (S126). At this time, the JOB scheduler can maintain the contents of the policy pool as latest information based on the basic principle that records for which there are no changes for a constant period after a registration time are deleted and latest information are maintained continuously (S127).

As the processes are executed as above, a user code of a client who can use Internet is allowed or blocked selectively.

Therefore, the steps for inputting a domain when entering an address on the URL window of a web browser, for inputting an address having parameters described after a domain or for moving to other sites in a search browser, for analyzing a concerned traffic after moving to the other site, and for calling a specific page (a web page, and a blocked page) by transmitting a virtual packet according to a TCP hijacking method if a concerned ID using a policy algorithm exceeds a allowed number of PC are executed so that Internet can be allowed or blocked selectively.

A case that Internet use is allowed via only one line will be explained with referring to a specific example of FIG. 6. For example, if the JOB scheduler is 10 minutes, a priority is given to the first person who connects to Internet among the users having a user code using the same ID and the same authorized IP. Since the user having a user code 192.168.0.1 (A) use Internet continuously for 20 minutes, even if a user code 192.168.0.2(B) or a user code 192.168.0.3(C) tries to connect to Internet, Internet use is blocked and thus they cannot use Internet.

At 30 minutes, if the JOB scheduler is executed, a record of the user having a user code 192.168.0.1(A) is deleted from a policy pool since there are no use records between 20-30 minutes.

At 31 minutes, if the user having a user code 192.168.0.3 (C) tries to connect to Internet, since the users having a user code using the same ID and the same authorized IP address are not recorded in a policy pool, after the user having a user code 192.168.0.3(C) registers an ID, an authorized IP address, a user code and a connection time in a policy pool, the user can connect to Internet.

Figure 8:
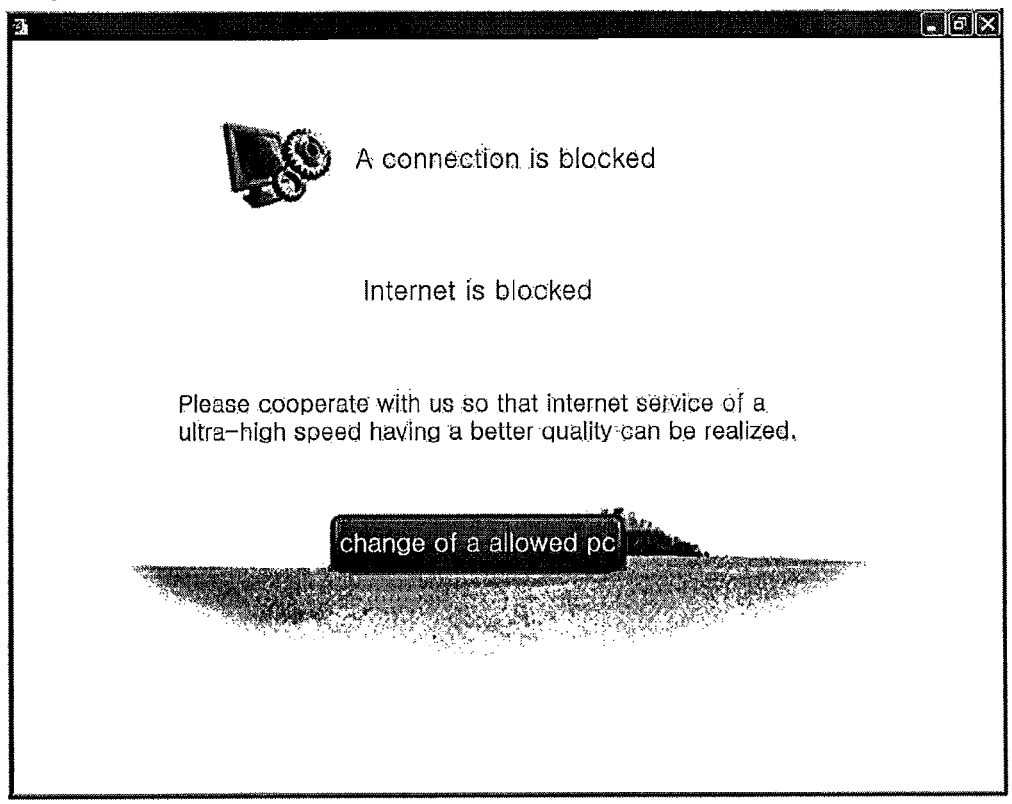
FIG. 8 is a diagram showing a button for changing a allowed PC in an Internet blocking page.

Until 70 minutes, the user having a user code 192.168.0.1 (A) and the user having a user code 192.168.0.2(B) try to connect to Internet, but they do not make connection to Internet. At this time, when the user having a user code 192.168.0.2(B) wants to use Internet (situation 1), as illustrated in FIG. 8, Internet use is blocked for the user having a user code 192.168.0.3(C) after changing a user having a current user code 192.168.0.3(C) of the same ID in a policy pool into a user having a user code 192.168.0.2(B) by clicking a button for changing a allowed PC in an Internet blocking page. Thus, a user having a user code 192.168.0.2(B) will have an Internet use right.

Figure 7:
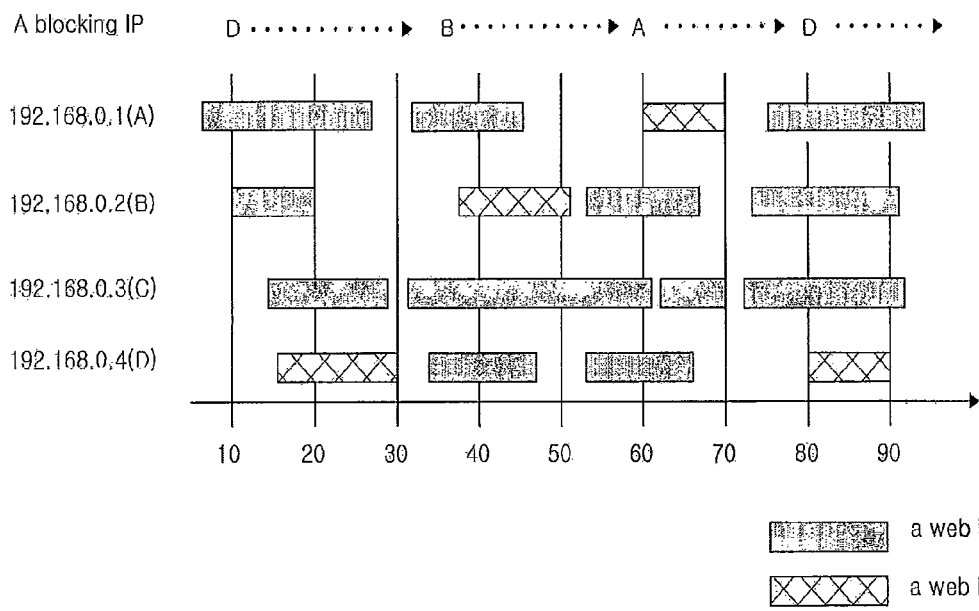
FIG. 7 is a diagram showing a case that an Internet use can be allowed via only three lines.

A case that Internet use is allowed via only three line in PMT will be explained with referring to a specific example of FIG. 7. A principle that three user codes using the same ID and the same authorized IP address is allowed to the maximum and an Internet use is blocked for other user codes is as follows.

When the user having a user code 192.168.0.1(A) tries to connect to Internet for the first time, after confirming whether a user having a user code using the same ID and the same authorized IP address exists in a policy pool or not, if there are no users using the same ID and the same authorized IP address, the user registers an ID, an authorized IP address, a user code and a connection time in a policy pool, and then he can connect to Internet.

At 10 minutes, when the user having a user code 192.168.0.2(B) tries to connect to Internet, after confirming whether a user having a user code using the same ID and the same authorized IP address exists in a policy pool or not, if there are users using the same ID and the same authorized IP address, Internet use is allowed and if there are no users using the same ID and the same authorized IP, the number of the user codes using the same ID and the same authorized IP address in a policy pool is counted, and the result value (a return value: 1) is below the number of the PMT policy (which allows three lines), a user registers a user code 192.168.0.2(B) and then he can use Internet. On the contrary, if the result value is above the number of the PMT policy (which allows three lines), Internet use is blocked.

At 15 minutes, when the user having a user code 192.168.0.3(C) tries to connect to Internet, after confirming whether a user having a user code using the same ID and the same authorized IP address exists in a policy pool or not, if there are users using the same ID and the same authorized IP address, Internet use is allowed and if there are no users using the same ID and the same authorized IP address, the number of the user codes using the same ID and the same authorized IP address in a policy pool is counted, and the result value (a return value: 2) is below the number of the PMT policy (which allows three lines), a user registers a user code 192.168.0.3(C) and then he can use Internet. On the contrary, if the result value is above the number of the PMT policy (which allows three lines), Internet use is blocked.

At 17 minutes, when the user having a user code 192.168.0.4(D) tries to connect to Internet, after confirming whether there are the same ID and the same authorized IP address in a policy pool or not, if there exists a private IP address having the same ID and the same authorized IP in a policy pool, Internet use is allowed and if there is not a private IP address, the number of the private IP address users having the same ID and the same authorized IP address in a policy pool is counted, and the result value (a return value: 3) is below the number of the PMT policy (which allows three lines), a user registers the private IP address and then he can use Internet. On the contrary, if the result value is above the number of the PMT policy (which allows three lines), Internet use is blocked.

As the procedures are processed as above, Internet use can be allowed or blocked selectively in a private network.

Generally, the environments such as OS version, Web browser version, .NET and the like are different according to the PC types of users. Information which uniquely indicates a web browser information, a user agent information or PC details information of a client included in a traffic of the users connecting to Internet and etc. are collected, compared, analyzed and stored based on this feature. At this time, during analysis and detection of the traffic, there are not hindrances at all for users, an IP address information of a traffic analysis server is not leaked out, and data is created as a database by judging whether NAT use is allowed or not, and analyzing and detecting the number of the sharing terminals. Further, according to the characteristics of the present invention, the users included in a policy can execute the steps for inputting a domain when entering an address on the URL window of a web browser, for inputting an address having parameters described after a domain or for moving to other sites in a search browser, and for allowing the clients who can use Internet at the same time in a private network when moving to the other site to use Internet, or for blocking Internet use selectively. Thus, Internet use is allowed or blocked for unauthorized and unspecified many persons.

INDUSTRIAL APPLICABILITY

According to the present invention, when a client uses Internet, the steps for judging whether NAT use of a client configuring and using a private network as well as a provided authorized IP address (an Internet IP address) is allowed or not, for analyzing and detecting the number of sharing terminals, for creating a database using data, and for formulating a policy by using information in database are performed by analyzing traffic under the circumstance which enables all concerned traffic to be monitored. Thus, when the users of a private network connect to Internet at the same time, permission or blocking of Internet use can be executed selectively.

Generally, the environments such as OS version, Web browser version, .NET and the like are different according to the PC types of users. Information which uniquely indicates a web browser information, a user agent information or PC details information of a client included in a traffic of the users connecting to Internet and etc. are collected, compared, analyzed and stored based on this feature. At this time, during analysis and detection of the traffic, there are not hindrances at all for users, an IP address information of a traffic analysis server is not leaked out, and data is easily created as a database by judging whether NAT use is allowed or not, and analyzing and detecting the number of the sharing terminals.

Further, according to the characteristics of the present invention, the users included in a policy can execute the steps for inputting a domain when entering an address on the URL window of a web browser, for inputting an address having parameters described after a domain or for moving to other sites in a search browser, and for allowing the clients who can use Internet at the same time in a private network when moving to the other site to use Internet, or for blocking Internet use selectively. Thus, Internet use is allowed or blocked for unauthorized and unspecified many persons.

In the infrastructures built by the CEOs of the existing Internet communication business, the maintenance cost of the equipments and a network, and a network speed are limited, but there is a traffic increase due to indiscreet use of NAT, and the sharing terminals and the like via only one provided line.

Consequently, the users who use only one line normally, or the users who subscribe to any lines and then use them had to suffer from much damages in the past, but according to the present invention, there are effects that the CEOs of the existing Internet communication business can improve various kinds of services in the future by investing smaller amount of facilities money and managing fewer maintenance staff. In addition, a common user enjoy a good quality service.

The invention claimed is:

1. A method for analyzing and detecting a judgement about whether to allow NAT (Network Address Translation) use by analyzing data traffic of sharing terminals under a circumstance of monitoring the data traffic, and a number of the sharing terminals, the method comprising:

extracting a user agent IP value of a packet header message in the data traffic of each of the sharing terminals by analyzing the data traffic of each of the sharing terminals;

determining times when the data traffic of each of the sharing terminals occur;

determining user agent codes corresponding to extracted user agent IP values that represent the corresponding determined data traffic times, the user agent IP values and the corresponding user agent codes being stored in a user agent pool (UA Pool) to enable corresponding sharing terminals to be controlled;

extracting a new user agent IP value of a new packet header message in new data traffic of a representative sharing terminal by analyzing the new data traffic of the representative sharing terminal, determining the time when the new data traffic of the representative sharing terminal occurs, determining a new user agent code corresponding to the extracted new user agent IP value, and comparing the extracted new user agent IP value with the stored user-agent IP values in the UA Pool;

when the new user agent IP value does not match any of the stored user agent IP values in the UA Pool, discarding the new user agent IP value;

when the new user agent IP value matches one of the stored user agent values in the UA Pool, storing the corresponding new user agent code in a user agent collection table (UA collection table) that includes a plurality of stored user agent codes corresponding to previously extracted user agent IP values, the user agent codes in the UA collection table being stored with corresponding user agent key values, the user agent key values including a character representing the day and hour of each of the determined times when the data traffic of the corresponding sharing terminal occurs;

identifying the length of time for each of the user agent codes stored in the UA collection table when there is the data traffic of the corresponding sharing terminal, grouping each of the user agent codes into different ID values according to the corresponding identified length of time, and recording each of the grouped user agent codes with the corresponding ID value;

storing, in a user agent table related to time (UA table related to time), the recorded user agent codes with the corresponding ID values;

counting the number of the recorded user agent codes stored in the UA table related to time that are not superimposed for each of the corresponding ID values at a constant time interval, and storing the ID values and the counted numbers for each of the corresponding ID values in a detection reference table;

adjusting the data traffic of the sharing terminals by controlling a number of the sharing terminals for each of the ID values to be less than a predetermined maximum number of sharing terminals for the corresponding ID value; and storing results obtained by the adjusting of the data traffic of the sharing terminals in a result table.

2. The method of claim 1, wherein the step of determining user agent codes includes analyzing whether each of the extracted user agent IP values is a valid user agent IP value or an invalid user agent IP value based on the packet header message.

3. A method for allowing or blocking users' PCs selectively which can use the Internet at the same time by analyzing and detecting a judgement about whether NAT (Network Address Translation) can be used and a number of sharing terminals, the method comprising:

monitoring data traffic of each of the sharing terminals that use the Internet;

receiving a request by a target user corresponding to a target sharing terminal among the sharing terminals, to use the Internet;

determining, after receiving the request by the target user, the times when the data traffic of each of the sharing terminals occurs;

determining a user agent code corresponding to a user agent IP value in a packet, the user agent code representing the determined data traffic time of the target sharing terminal;

storing the user agent IP value and the corresponding user agent code in a user agent pool (UA pool), wherein the UA pool is used to determine whether NAT use for the target user is allowed;

receiving additional requests by additional users respectively corresponding to additional sharing terminals among the sharing terminals, to use the Internet;

determining, after receiving the additional requests by the additional users, the times when the data traffic of each of the sharing terminals occur;

determining additional user agent codes respectively corresponding to additional user agent IP values in corresponding packets, the additional user agent codes representing the determined data traffic times of the corresponding additional sharing terminals, respectively;

storing all of the user agent codes in the UA pool in a real-time manner for the determined data traffic times of the corresponding sharing terminals, and maintaining real-time user code information in all of the user agent codes;

storing, in a user agent collection table (UA collection table), user agent key values respectively including characters representing the day and hour of the determined times when the data traffic of the corresponding sharing terminals occur, and the corresponding user agent codes;

identifying the length of time for each of the user agent codes stored in the UA collection table when there is the data traffic of the corresponding sharing terminal, grouping each of the user agent codes stored in the UA collection table into different ID values according to the corresponding identified length of time, and recording each of the grouped user agent codes with the corresponding ID value;

determining which of the sharing terminals are allowed to use the Internet and managing the UA pool according to each of the grouped user agent codes recorded with the corresponding ID value by a comparison algorithm of a PMT (Policy Management Table) when sharing terminals using NAT connect to the Internet simultaneously; and allowing one of the sharing terminals which is subscribed by an ISP (Internet Service Provider) to use the Internet by transmitting a virtual packet according to a TCP hijacking manner when the number of the sharing terminals using NAT exceeds a predetermined policy number of allowed sharing terminals, wherein Internet use of the sharing terminals not allowed to use the Internet is blocked according to the predetermined policy number of allowed sharing terminals based on the PMT.

4. The method of claim 3, wherein, if a button for changing whether a sharing terminal of a concerned user is allowed or blocked in a blocked page is pressed, a sharing terminal corresponding to a user agent code stored in the UA pool is randomly blocked and not allowed to use the Internet, and a user agent code which is not used for a constant time in the stored UA pool is deleted.

5. The method of claim 3, wherein when inputting a domain when entering an address on a URL window of an Internet web browser, inputting an address having parameters described after a domain, or moving to other Internet sites in a search browser, selective allowance or blocking of the sharing terminals is executed with respect to moving to the other Internet sites.

* * * * *